(12) United States Patent
Taneja

(10) Patent No.: US 8,041,748 B2
(45) Date of Patent: Oct. 18, 2011

(54) METHOD AND APPARATUS FOR MANAGING A WEB CACHE SYSTEM

(75) Inventor: Manik Taneja, Pune (IN)

(73) Assignee: NetApp, Inc., Sunnyvale, CA (US)

( * ) Notice: Subject to any disclaimer, the term of this patent is extended or adjusted under 35 U.S.C. 154(b) by 649 days.

(21) Appl. No.: 11/250,597

(22) Filed: Oct. 14, 2005

(65) Prior Publication Data

US 2006/0288088 A1    Dec. 21, 2006

(51) Int. Cl.
*G06F 7/00* (2006.01)
(52) U.S. Cl. ........................... 707/803; 707/812
(58) Field of Classification Search .................. 707/203, 707/104.1, 802, 812; 709/242, 225
See application file for complete search history.

(56) References Cited

U.S. PATENT DOCUMENTS

| | | | |
|---|---|---|---|
| 7,035,943 B2 * | 4/2006 | Yamane et al. | 709/248 |
| 2002/0016860 A1 * | 2/2002 | Garcia-Luna-Aceves et al. | 709/245 |
| 2004/0044767 A1 * | 3/2004 | Rivers et al. | 709/225 |
| 2005/0044193 A1 * | 2/2005 | Benhase et al. | 709/223 |
| 2006/0235889 A1 * | 10/2006 | Rousseau et al. | 707/104.1 |
| 2006/0271705 A1 * | 11/2006 | Garcia-Luna-Aceves | 709/242 |

OTHER PUBLICATIONS

U.S. Appl. No. 12/105,914 entitled Flow Based Reply Cache filed on Apr. 18, 2008 by Jason L. Goldschmidt, 31 pages.
U.S. Appl. No. 12/369,502 entitled Cache-Based Storage System Architecture filed on Feb. 11, 2009 by Steven R. Kleiman, 31 pages.
U.S. Provisional Appl. No. 61/028,094 entitled Cache-Based Storage System Architecture filed on Feb. 12, 2008 by Steven R. Kleiman, 31 pages.
U.S. Appl. No. 12/401,993 entitled System and Method for Managing a Flow Based Reply Cache filed on Mar. 11, 2008 by Jason L. Goldschmidt, 40 pages.

* cited by examiner

*Primary Examiner* — Donald Lawson
(74) *Attorney, Agent, or Firm* — Cesari and McKenna, LLP

(57) ABSTRACT

A method and apparatus for managing a web cache system includes storage spaces allocated to web cache devices for storing cached information. Upon failure of a web cache device, the storage space allocated to that device is reallocated to a different operational device, so that the cached information in that reallocated storage space may be used.

12 Claims, 6 Drawing Sheets

METHOD AND APPARATUS FOR MANAGING A WEB CACHE SYSTEM

RELATED APPLICATIONS

This application claims the benefit of Foreign Filed Indian Application No. 655/CHE/2005, filed on May 30, 2005, which is herein incorporated in its entirety by reference.

BACKGROUND

As the number of computer systems have increased, so has the amount of information available to users of those computer systems. Many computer systems are connected together through networks, allowing users in many different locations to access information from a wide variety of information sources throughout the world.

When a user requests information from a remote computer system, the request often passes from the requesting system through one or more other computer systems prior to arriving at the remote system having requested the information. The requested information is then retrieved, packaged and sent from the remote system, passing through a similar number of computer systems on its way back to the requesting system.

Some information is more desirable, and is therefore accessed by greater numbers of users than seen with respect to less desirable information. Further, some users may access certain information frequently. Multiple instances of retrieving the same information utilizes connection bandwidth and web server resources that would otherwise be available to use for other tasks.

Some networked systems employ web cache devices that make a local copy of retrieved information, to avoid multiple remote retrievals of the same information. Web cache devices also minimize the latency associated with retrieval of information, since cached information is retrieved much more quickly than if the information were retrieved from its original remote location.

Web cache devices may also be associated with specific web servers and placed at various geographical locations, in order to reduce the load on the web server, and to ensure that information requested from the web server is delivered in a timely manner.

In systems employing web cache devices, if a web cache device fails, cached information associated with the failed web cache device typically becomes unavailable. As such, requests for information previously cached on the failed web cache device will typically result in the information being retrieved from its original remote location.

SUMMARY

A web cache system is described, including first and second web cache devices coupled to each other, and coupled to a storage system. The storage system defines a first storage space allocated to the first web cache device and a second storage space allocated to the second web cache device. Upon detection of the failure of the first web cache device, the first storage space is re-allocated to the second web cache device.

In such a web caching system, the second web cache device is configured to receive a request for information from a requesting computer system and responsively determine whether a local copy of the requested information is present within any of the second web cache device, the first storage space, or the second storage space. If a local copy of the requested information has not been found within those locations, other web cache devices present in the system are queried to determine whether the local copy of the requested information is available from those other web cache devices. If a local copy of the information is located, that local copy of the requested information is provided to the requesting computer system.

Optionally, the first and second storage spaces are disposed within different ones of the multiple storage devices. Also, the storage system optionally includes the multiple storage devices configured as a shared cluster.

The second and third web cache devices may be configured to use a voting algorithm, upon detection of the failure of the first web cache device, to decide which of the second and third web cache devices will take over control of information previously controlled by the failed first web cache device.

Alternatively, a resource manager may be configured to detect the failure of the first web cache device, and to trigger reallocation of the first storage space to either of the second or third web cache device, responsive to that detection of failure.

Methods for managing the web cache system are also described herein, together with a machine readable medium containing executable instructions to perform those methods.

Other aspects and advantages of the invention will be apparent from the following description and the appended claims.

DETAILED DESCRIPTION

Figure 1:
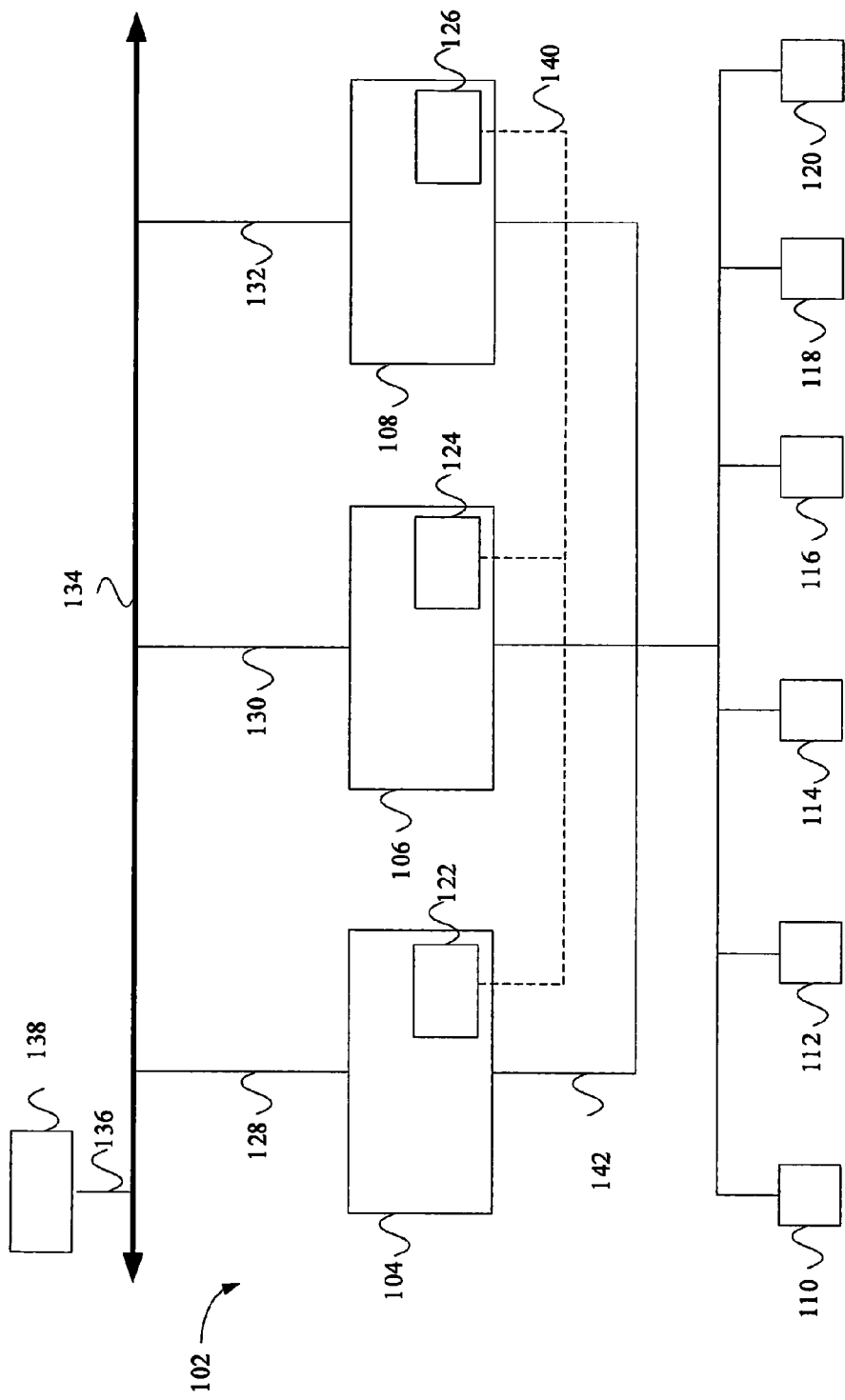
FIG. 1 shows a block diagram showing a web cache system according to one or more embodiments of the present invention.

Exemplary embodiments of the invention will be described with reference to the accompanying drawings. Like items in the drawings are shown with the same reference numbers.

In an embodiment of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In this specification, it is intended that the term "coupled" describe devices which communicate and interact with each other, directly or indirectly. For example, first and second devices that interact with each other by sending information directly from one to the other through a transmission line between the two devices are directly coupled. Further, first and second devices that have intermediate devices disposed between them, and interact with one another through those intermediate devices, are indirectly coupled. In both situations, the first and second devices are considered coupled.

In general, embodiments of the invention relate to a method and apparatus for managing a web cache system. In one or more embodiments of the present invention, a web caching system includes first and second web cache devices coupled to each other, and a storage system coupled to the first and second web cache devices. The storage system defines a first storage space allocated to the first web cache device and a second storage space allocated to the second web cache device. Upon detection of the failure of the first web cache device, the first storage space is re-allocated to the second web cache device.

FIG. 1 shows a block diagram showing a web cache system according to one or more embodiments of the present invention. Web cache system 102 includes web cache devices 104, 106, and 108, each coupled to client computer systems 110, 112, 114, 116, 118 and 120.

Many different configurations of web cache systems are possible, with each web cache device in the system being able to perform services ranging from the very general to the very specific, as system needs dictate.

For example, web cache devices 104, 106, and 108 may each be configured to process information requests from the various user computer systems in a round-robin fashion, with a different web cache device responsible for managing each incoming information request.

Alternatively, each different web cache device may be configured to process information requests from certain different requesting computer systems, or to instead process certain types of information requests from all requesting computer systems, or some combination of the two configurations, as the system needs dictate.

In one or more embodiments of the present invention, web cache device 104 is configured to process HTTP requests, and web cache device 106 is configured to respond to Microsoft Media Server (MMS) requests. Finally, web cache device 108 is configured to process HTTPS requests. Thus, MMS requests arriving at either of web cache device 104 or web cache device 108 will be passed through, rerouted, or rejected, depending on the system configuration. Correspondingly, HTTP requests arriving at either of web cache device 106 or web cache device 108 will be passed through, rerouted, or rejected, and HTTPS requests arriving at either of web cache devices 104 or 106 will be passed through, rerouted, or rejected, depending on the system configuration.

Persons of ordinary skill in the art having the benefit of this disclosure will readily appreciate that only a few types of requests (e.g. HTTP, MMS, and HTTPS) have been used as examples herein, and that many other types of information requests may be served by a web cache device, such as web cache devices 104, 106, and 108.

As an alternative to the system configuration just described, particular web cache devices may instead be configured to process many different types of information requests, but be limited to processing information requests originating from a specific group of client computer systems. In one or more embodiments of the present invention, web cache devices 104, 106, and 108, are each configured to process all information requests originating from different subgroups of client computers.

For example, in one or more embodiments of the present invention, web cache device 104 is configured to process all information requests originating from certain requesting computer systems such as client computers 110 and 112. Correspondingly, in this example, web cache device 106 is configured to process all information requests originating from client computers 114 and 116, and web cache device 108 is configured to process information requests originating from client computers 118 and 120.

Persons of ordinary skill in the art will readily appreciate that different web cache devices may be uniquely configured, to support different numbers of requesting computers, or to provide certain services. Thus, a given web cache device, such as web cache device 106, may support a few hundred requesting computers, such as client computer 114, over a wide range of services, while a different web cache device, such as web cache device 108, may support several thousand requesting computers over a smaller range of services. Many such configurations are possible.

In one or more embodiments of the present invention, web cache devices 104, 106, and 108 are coupled to storage spaces 122, 124, and 126 respectively. In one or more embodiments of the present invention, a storage space such as storage space 122 includes a portion of or all of a storage device such as a hard disk, a writable compact disk read only memory (CD-ROM), a writable digital versatile disk (DVD), etc. Individual storage spaces such as storage space 122 may be disposed over portions of different storage devices.

In one or more embodiments of the present invention, storage spaces 122, 124, and 126 are individual, separately allocated portions of a single storage device.

Alternatively, storage spaces 122, 124, and 126 are disposed within two or more separate storage devices in communication with each other. In one or more embodiments of the present invention, the two or more separate storage devices are configured as a shared cluster. Persons of ordinary skill in the art having the benefit of this disclosure will readily understand how to practice the present invention using a shared cluster while remaining within the scope and spirit of the present invention.

Storage spaces 122, 124, and 126 may be disposed within web cache devices 104, 106, and 108 respectively, or may instead be disposed within a storage system external to the respective web cache devices. Thus, the failure of a web cache device such as web cache device 104 does not necessarily result in the failure of the corresponding storage space, such as storage space 122.

Each web cache device such as web cache devices 104, 106, and 108 are coupled through transmission lines 128, 130, and 132 to transmission line 134. Transmission line 134 is coupled to transmission line 136 and remote computer system 138.

Persons of ordinary skill in the art having the benefit of this disclosure will readily recognize that information passing from remote computer system 138 to any of the client computers, such as client computer 110, may pass through several network-capable devices disposed between remote computer system 138 and client computer system 110, including any of web cache devices 104, 106, or 108.

Those skilled persons will also readily recognize that web cache devices 104, 106, and 108 are provided to minimize network latency associated with responding to information requests submitted by requesting computer systems, such as any of client computers 110, 112, 114, 116, 118 and 120.

To reduce network latency, web cache devices 104, 106, and 108 process information requests received from requesting computer systems by first determining whether a local copy of the requested information exists within system 102. That local copy may be within a web cache device memory, or may be within a storage space such as storage space 122, 124, and 126.

If a local copy of the requested information doesn't exist within system 102, the web cache device requests the information from the original source computer system having that information, such as remote computer system 138. The original source computer system, then sends the requested information to the requesting web cache device, which stores a copy of that requested information locally. The web cache device also sends the requested information along to the requesting computer system.

A later information request submitted by a requesting computer that requests the same information as before results in the web cache device providing the desired information to the client without having to retrieve the information again from remote computer system 138.

Local copies of such information are often temporarily stored in very fast, accessible memory such as a random access memory disposed within a web cache device. However, some or all of that information is periodically stored to more permanent storage areas, such as storage spaces 122, 124, and 126.

In one or more embodiments of the present invention, storage spaces 122, 124, and 126 are coupled to each other over a high speed transmission line 140. Alternatively, storage spaces 122, 124, and 126 are coupled through transmission lines 142.

In one or more embodiments of the present invention, when a web cache device such as web cache device 104 fails, leaving storage space 122 operational, one of web cache devices 106 or 108 is allocated control of the information within storage space 122. Such a web cache device e.g. 106 or 108 which has been allocated control of the information within storage space such as storage space 122 has access to information stored within that storage space 122, and may read, write, delete or otherwise modify that information, as necessary. Any information loss attributed to the failure of web cache device 104 will be restricted to any information that may have been in associated temporary storage.

The decision as to which of web cache devices 106 or 108 should be allocated control of the information within storage space 122 may be made using any desirable criteria and method. For example, web cache devices being considered often experience different average usage, may experience different latencies, may be configured differently, etc. Any or all of those factors may be considered, when determining which web cache device should be allocated control of the information within storage space 122.

In one or more embodiments of the present invention, a voting algorithm is employed to make the decision as to which web cache device assumes control of the information within a storage space presently allocated to a failed web cache device. Once the decision is made, any required processes needed to give the control to the proper web cache device are executed.

Figure 2:
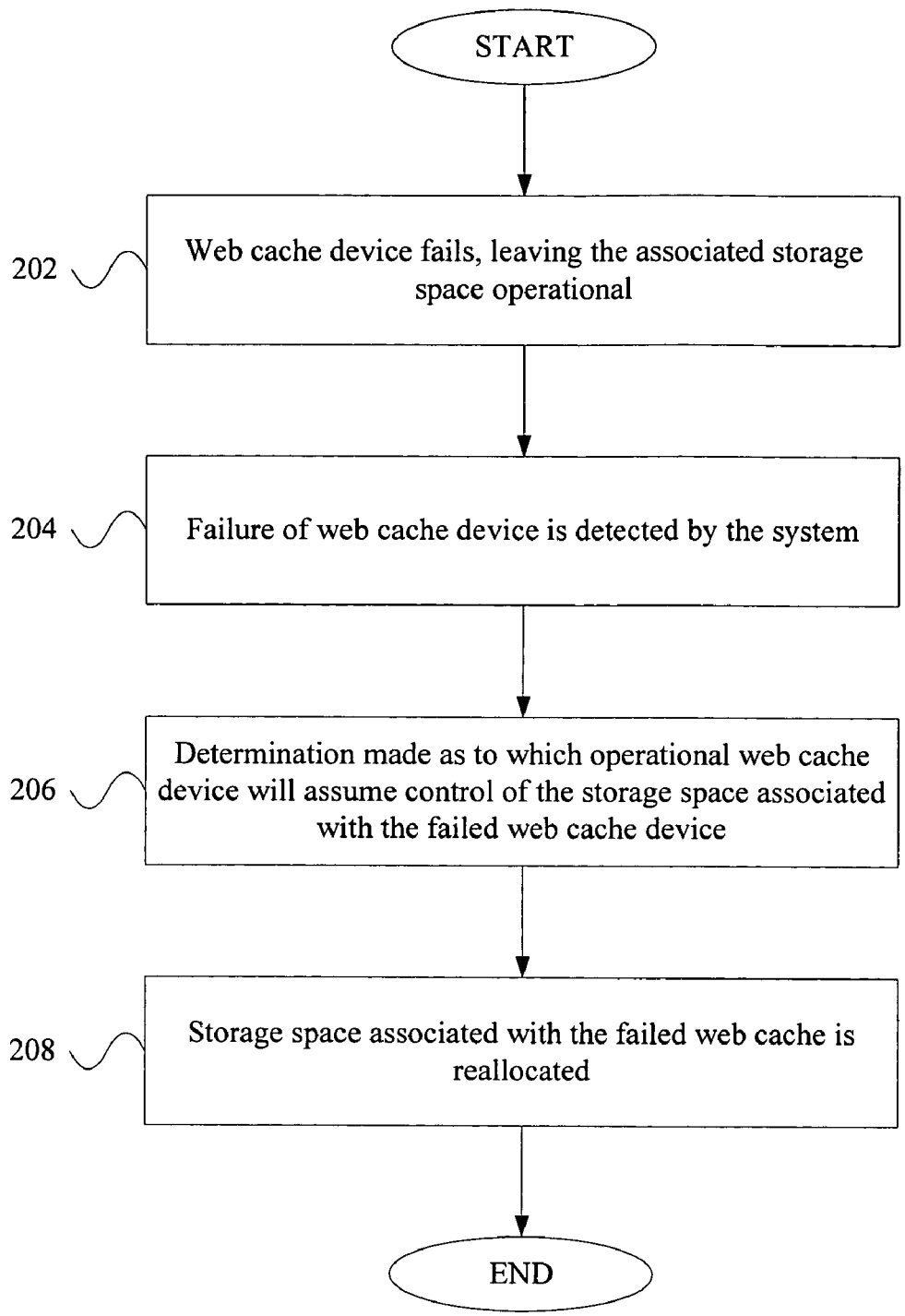
FIG. 2 shows a flowchart showing a method according to one or more embodiments of the present invention.

FIG. 2 shows a flowchart showing a method according to one or more embodiments of the present invention. At block 202 a web cache device such as web cache device 104 fails, leaving its corresponding storage space operational.

At 204, the failure of web cache device 104 is detected by system 102. Detection can take place in a number of ways. In one embodiment of the present invention, one or more web cache devices in the system such as web cache device 106 periodically sends a message to other web cache devices in the system, such as web cache devices 104 and 108. A web cache device failing to respond to a given number of such messages sent in succession, or failing to respond to one or more such messages within a predetermined time, is deemed to have failed.

At 206, a determination is made as to which web cache device, such as web cache device 108 of FIG. 1, will assume control of the information within the storage space 122 associated with the failed web cache device 104. This determination may be made using any desired method. In one or more embodiments of the present invention, a voting algorithm is used to determine which web cache device will assume control of the information within the storage space associated with a failed web cache device. Having control of the information within a given storage space is substantially similar to having control of the storage space itself, since it is the information that is important.

In addition to determining which web cache device will assume control of the information within the storage space associated with a failed web cache device, it is also necessary to which of the operational web cache devices will assume responsibility for responding to certain types of information requests that would otherwise have been handled by the failed first web cache device. This determination may be made in the same manner as described here with respect to assuming control of the storage area associated with a failed web cache device.

In a system where two or more web cache devices are designated to share the load previously handled by a failed web cache device, it may be desirable to provide access to the storage area associated with the failed device to each of those two or more web cache devices.

In one or more embodiments of the present invention, a web cache device within the system (e.g., web cache device 108) is designated as a fail-over device. In this example, web cache device 108 is the designated device that will assume control of the information within the storage space associated with any failed web cache device. Thus, in this example, when it is determined that web cache device 104 has failed, the system automatically reallocates control of the information within the associated storage space 122 to web cache device 108.

In one or more embodiments of the present invention, the determination of which devices will assume control of the information within the storage space associated with a failed web cache device is made using load balancing criteria, including information relating to the services and types of requests handled by the various operational web cache devices.

At 208, the storage space associated with the failed web cache device is reallocated to the device determined at block 206. Thus, at this point, the web cache device determined at block 206 (for example, web cache device 108) has control of and access to the information stored within the storage area previously associated with the failed web cache device 104.

At some point following the failure of a web cache device and the reallocation of information to one or more operational web cache devices, it may be desirable to replace the failed web cache device with a new web cache device. Though the storage space previously allocated to a failed device has been reallocated to a different web cache device present in the system, it may be beneficial at some point to again reallocate that same storage space to a new device added to the system, in order to put the system in a state similar to that which existed prior to the failure.

Figure 3:
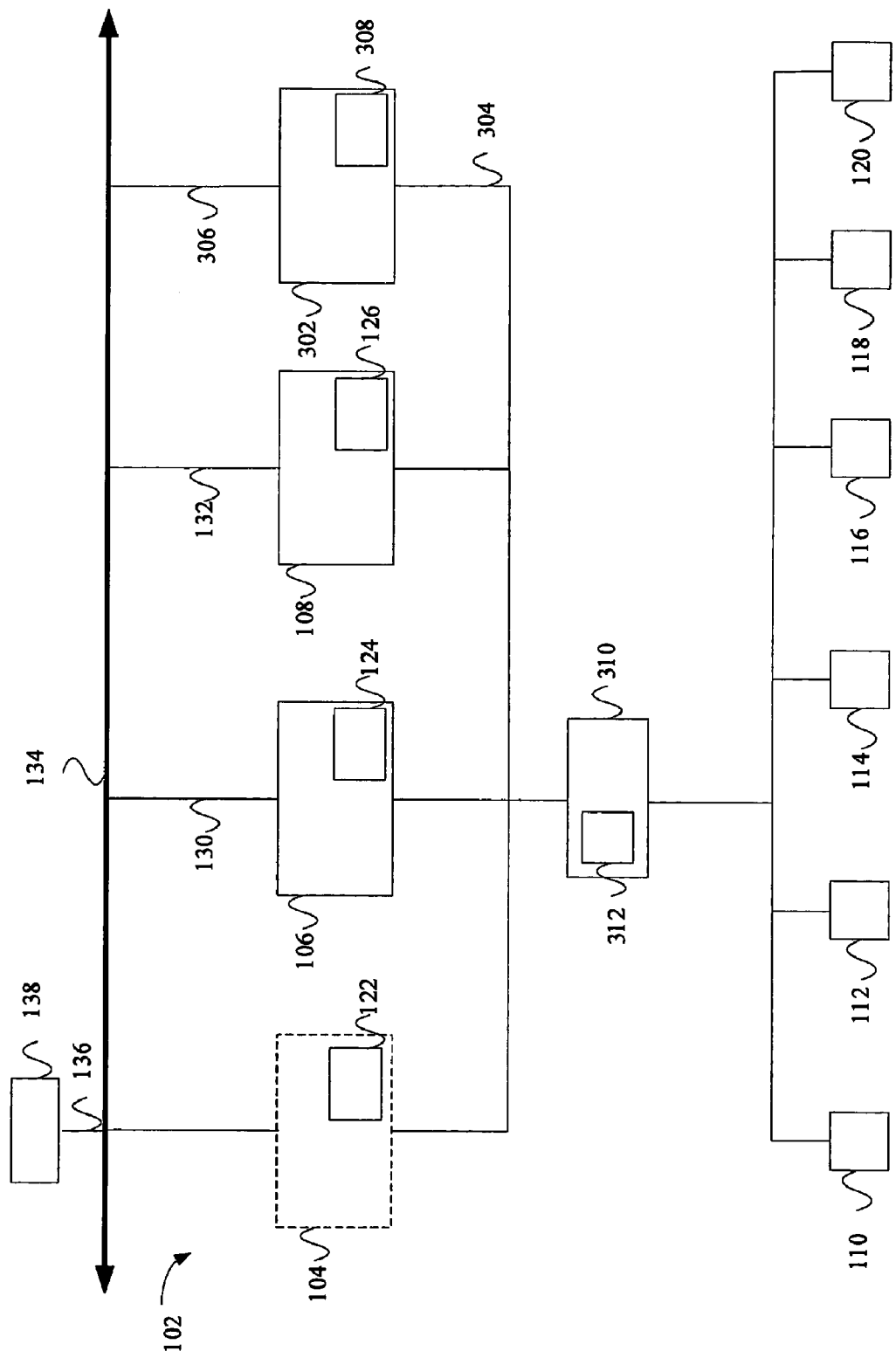
FIG. 3 shows a block diagram of a web cache system according to one or more embodiments of the present invention.

FIG. 3 shows a block diagram of a web cache system according to one or more embodiments of the present invention.

Referring to FIG. 3, web cache device 302 has been added to the system of FIG. 1. Web cache device 302 is coupled to web cache devices 106 and 108 over transmission line 304, and is coupled to transmission line 134 over transmission line 306. Further, web cache device 302 is optionally associated with storage space 308.

Also new in FIG. 3 as compared to the system 102 of FIG. 1 is optional resource manager 310 coupled to web cache devices 106, 108, and 302 as well as to client computers 110, 112, 114, 116, 118, and 120.

In one or more embodiments of the present invention, resource manager 310 is configured to route information requests originating from a requesting computer such as any of client computers 110, 112, 114, 116, 118, and 120. Further, resource manager 310 is optionally configured to detect the failure of a web cache device, such as failed web cache device 104, and to optionally reallocate control of the information within a storage space associated with such a failed web cache device, such as storage space 122.

In order to route information requests, according to one or more embodiments of the present invention, resource manager 310 includes cache device information 312 including a list of web cache devices and the types of requests those web cache devices are configured to process. Such cache device information 312 may further include a device identifier associated with each web cache device, a desired fail-over device for one or more web cache devices within the system, configuration information for one or more web cache devices within the system, etc. One example of cache device information 312 is presented below as Table 1.

TABLE 1

| Device ID | Priority for type of request | Request type | Failover Device | Priority of Failover | Status | IP address group served |
|---|---|---|---|---|---|---|
| 124.9.226.8 | 1 | HTTP | 124.9.226.9 | | Active | ALL |
| 124.9.226.9 | 2 | HTTP | 124.9.226.8 | 2 | failed | ALL |
| 124.9.226.9 | 1 | HTTPS | 124.9.226.10 | 1 | Active | ALL |
| 124.9.226.9 | 1 | HTTPS | 124.9.226.10 | 1 | Active | ALL |
| 124.9.226.10 | 2 | HTTPS | | | Active | ALL |
| 124.9.216.9 | 1 | Type 3 | | | Active | ALL |
| 124.9.126.9 | 1 | Type 3 | | | Active | ALL |

Persons of ordinary skill in the art having the benefit of this disclosure will readily appreciate that cache device information 312 may be disposed within resource manager 310, or may instead be disposed within another device coupled to resource manager 310. It will be further appreciated by those skilled persons that cache device information 312 may be presented as a linked list, a tree, a stack, or any other type of data structure deemed appropriate for the architecture of the particular web cache system employing the present invention.

In one or more embodiments of the present invention, web cache system 102 (of FIG. 3) is configured so that different web cache devices are designated to process information request by request type. In one example of this configuration, in one or more embodiments of the present invention, when resource manager 310 receives an information request, resource manager 310 processes information 312 to determine which web cache device should handle the incoming information request. There may be multiple web cache devices capable of handling a given request type, prioritized so that information requests of that request type will first be routed to the higher priority web cache device, assuming that higher priority web cache device is available to process requests. If the higher priority web cache device is not presently available to process information requests, a lower priority web cache device capable of processing the particular information request may be selected, using cache device information 312.

Alternative to having one or more web cache devices designated as secondary devices for handling a given request type, in one or more embodiments of the present invention, resource manager 310 is configured to balance the number of particular types of requests routed web cache devices configured to handle those request types, so that the processing loads across similarly configured web cache devices are manageable.

As previously discussed, cache device information 312 may contain failover information designating one or more web cache devices to act in place of a failed device, receiving and processing information requests that would have otherwise have been processed by the failed device.

In one or more embodiments of the present invention, resource manager 310 processes cache device information 312 to determine a second device designated to act in place of a first failed device. In one or more embodiments of the invention, as can be seen in Table 1, there may be more than one device capable of acting in place of a given failed device. Priority information may be provided which can be used to determine which of several capable devices should first be designated to handle information requests that would otherwise have been processed by the failed device.

If the failed device was configured to handle more than one type of request, or was handling information requests otherwise able to be categorized into two or more different categories (by the address of the client computer initiating the information request, for example) those different categories of requests may be assigned to different cache devices as failover devices. As previously discussed, there is cached information within storage spaces associated with the failed web cache device. In one or more embodiments of the present invention, control of different portions of the information relating to the different categories of information requests now being processed by the failover devices is given to those failover devices.

In one or more embodiments of the present invention, web cache device 302 is configured similarly to the failed web cache device 104 and is designated to provide at least some of the services previously provided by failed web cache device 104. Services that were previously performed by the failed web cache device 104 that are not performed by web cache device 302 may be performed by another web cache device in the system, such as web cache device 106.

At some point, since web cache device 302 is configured to provide at least some of the services previously provided by failed web cache 104, it may be desirable to reallocate control of storage space 122 to web cache 302, to reduce latency associated with information requests that would have otherwise been processed by the failed web cache device 104.

Figure 4:
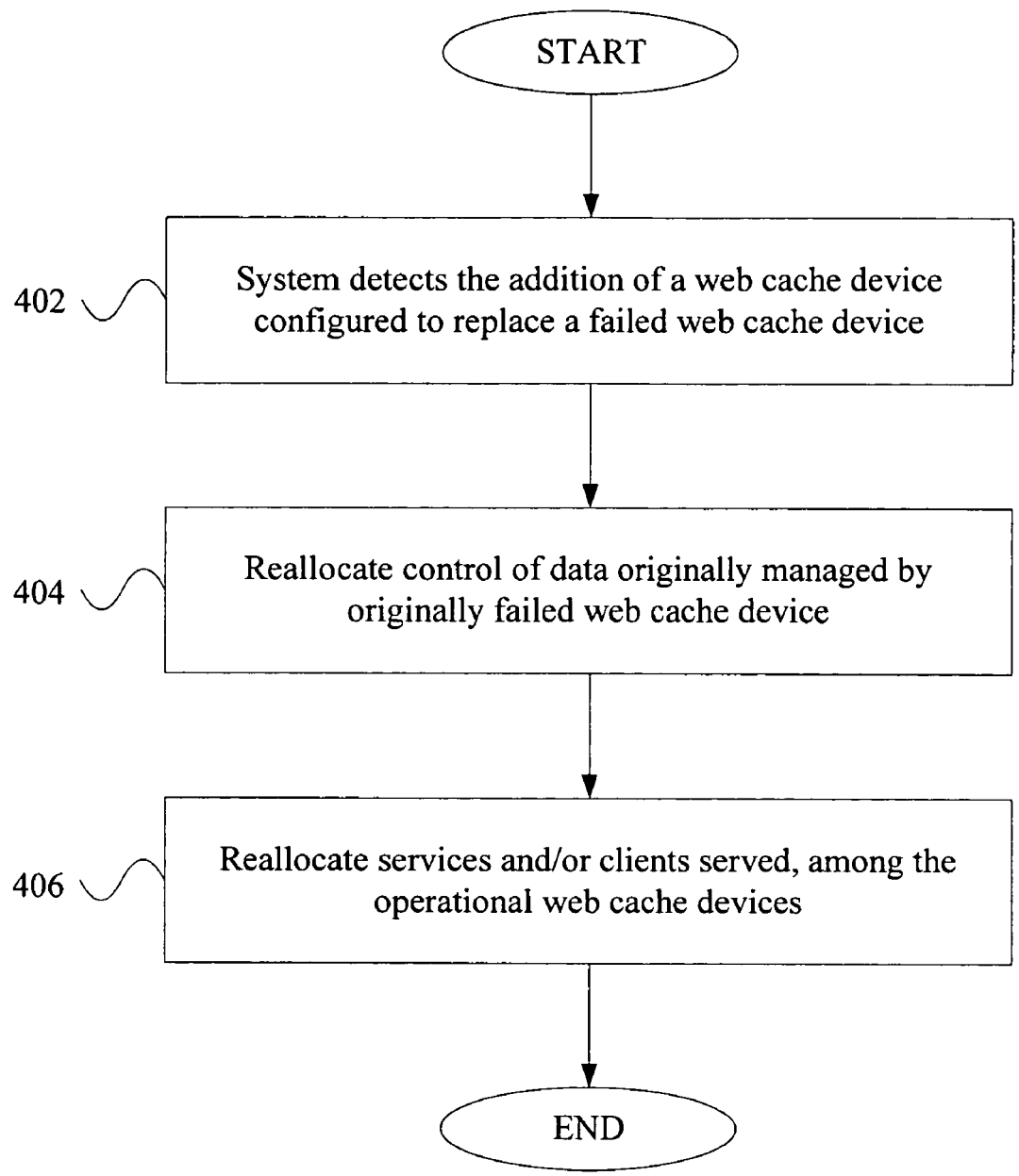
FIG. 4 shows a flow chart showing a method according to one or more embodiments of the present invention.

FIG. 4 shows a flow chart showing a method according to one or more embodiments of the present invention.

At 402, it is determined that a new web cache device (such as web cache device 302 of FIG. 3) has been added to the system and is configured to manage the information associated with a previously failed device (such as web cache device 104 of FIG. 1).

At 404, control of the information presently within the storage space (such as storage space 122 of FIG. 1) previously associated with a failed web cache device (such as web cache device 104 of FIG. 1) is reallocated to the new web cache device 302.

Optionally, either when the original reallocation took place from the failed device to an operational device at block 208, or at this time, some of the information within storage space 122 may be redistributed among other storage spaces within the system (such as storage spaces 124 and 126 of FIG. 1), depending on system needs and the allocation of services being provided by each of the web cache devices within web cache system 102.

At 406, a reallocation of the services being provided by one or more of the operational web cache devices is performed, depending on system needs, the loads experienced by various ones of the web cache servers, etc.

Other configurations of storage spaces and devices are considered to be within the scope and spirit of the invention. For example, in one or more embodiments of the present invention, storage spaces 124 and 126 of FIG. 1 are disposed as separate storage spaces within a single storage device. Alternatively, storage spaces 124 and 126, and 302 are instead disposed within two, three, or more storage devices. In one or more embodiments of the present invention, at least one storage space such as storage space 124 is allocated across multiple storage devices.

As previously discussed, the various storage devices within a web cache system may be disposed within a storage system configured as a shared cluster.

Figure 5:
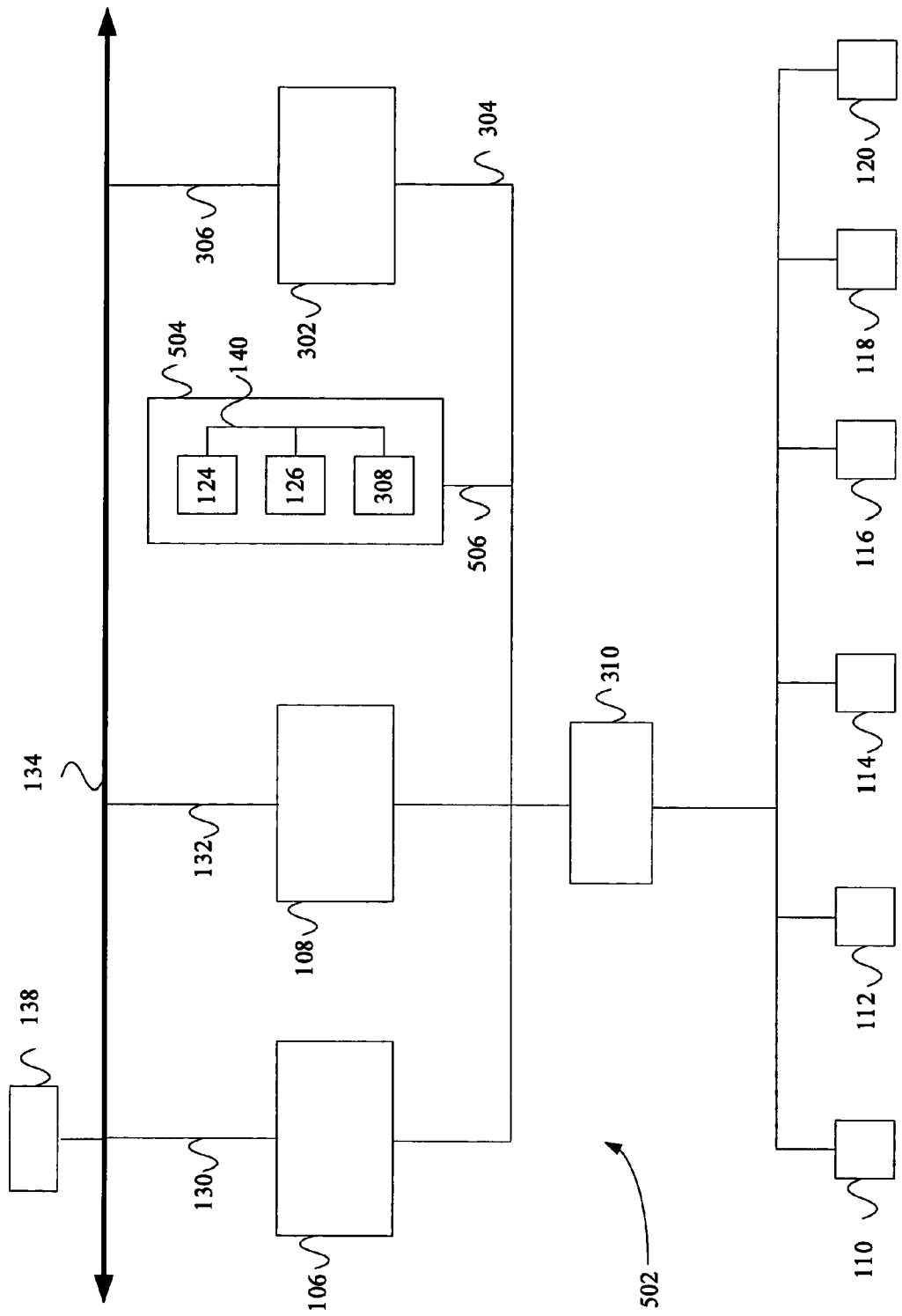
FIG. 5 shows a block diagram according to one or more embodiments of the present invention.

FIG. 5 shows a block diagram according to one or more embodiments of the present invention. In the web cache system 502, storage spaces 124, 126 and 302 are no longer disposed within web cache systems 106, 108, and 302, but are instead configured as a shared cluster within storage system 504. Optional high speed connection 140 allows information to move between storage areas 124, 126, and 302 very quickly. Storage system 504 is also coupled to various system devices such as optional resource manager 310 through transmission line 506.

In one or more embodiments of the present invention, when using a shared cluster such as seen here, upon replacement of a failed web cache device by a new web cache device, the new web cache device is allocated control of the storage space previously associated with the failed web cache device, as desired.

Mention has been made in this disclosure of one or more web cache devices assuming control of information within a storage space previously allocated to a failed web cache device. If it is desired that the storage space previously allocated to that device remain distinct from other storage spaces within the system, the web cache device assuming control of that information changes its search methods to accommodate the availability of that additional information.

Figure 6:
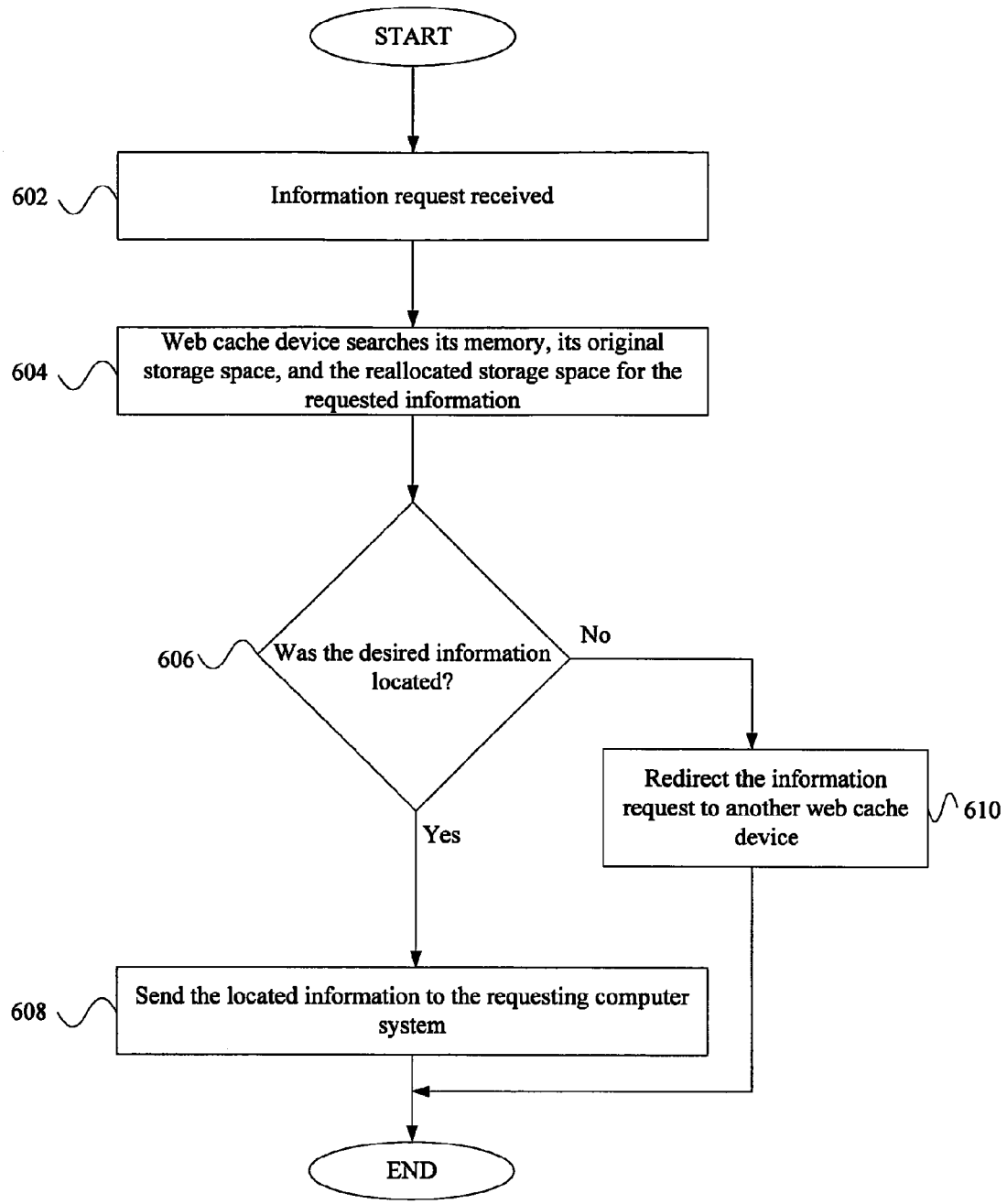
FIG. 6 shows a flow chart according to one or more embodiments of the present invention.

FIG. 6 shows a flow chart according to one or more embodiments of the present invention. At 602, an information request is received by a web cache device (such as web cache device 108 of FIG. 1) that has been allocated control of the information within the storage space previously allocated to a failed web cache device. Such a web cache device thus has control of information within its original storage space (such as storage space 126 of FIG. 1) and also has control of the information within the second storage space (such as storage space 122, also of FIG. 1).

The information request received at 602 may be received from a resource manager such as resource manager 310 of FIG. 3, or may be received from a requesting computer system (such as client computer system 110 of FIG. 1).

At 604, web cache device 108 performs a search of its internal memory, its original storage space 126, and storage space 122 in order to determine whether a local copy of the requested information exists within those areas controlled by web cache device 108.

At 606, it is determined whether a local copy of the requested information was located. If yes, the method proceeds at 608 where that located information is packaged and sent to the requesting computer system. If no, the method proceeds at 610 where the information request is redirected to another web cache device within system 102.

Alternatively, at 610 web cache 108 maintains responsibility for satisfying the received information request, and web cache 108 instead queries other web cache devices in the system such as web cache device 106 to determine whether those other web cache devices have a local copy of the requested information. If a local copy of the requested information exists within any of the web cache devices in the system, that local copy may either be sent to the requesting computer system by the web cache device in possession of that requested information, or may instead be sent to the requesting computer system through web cache device 108.

In one or more embodiments of the present invention, a single storage space (such as storage space 124) services multiple web cache devices such as web cache devices 104 and 106. In these embodiments, when an information request is serviced by any of those multiple devices, relevant information stored within the single storage space is used to service the information request, if applicable. Upon failure of one of the multiple web cache devices, others of the multiple web cache devices may take over handling the information requests that were previously handled by the failed device, without having to reallocate control of cached information.

Computer code implementing the methods presented in this disclosure may be stored in memory in a computer, or alternatively stored in more permanent computer readable medium such as hard drives, optical disks, compact disks, and magnetic tape. Further, such code may be transferred over communications networks with or without a carrier wave.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A web cache system comprising:
a plurality of web cache devices, wherein a first web cache device of the plurality of web cache devices is coupled to a second web cache device and a third web cache device of the plurality of web cache devices;
a storage system coupled to the plurality of web cache devices;
wherein the first web cache device, the second web cache device, and the third web cache device are allocated, by a processor of the storage system, a first storage space, a second storage space, and a third storage space respectively, within the storage system, the first, second, and third storage spaces disposed within a plurality of storage devices coupled to the storage system;
a resource manager configured to detect a failure of the first web cache device, and, responsive to detection of the failure of the first web cache device, further configured to select, using a voting algorithm, either the second web cache device or the third web cache device to assume control of information stored within the first storage space; and
wherein control of the information stored within the first storage space is reallocated to the selected one of the second or third web cache devices, responsive to the failure of the first web cache device wherein control of the information includes reading, writing or deleting the information stored within the first storage space.

2. The system of claim 1 wherein the selected one of the web cache devices is the second web cache device configured to:
receive an information request from a requesting computer system for requested information in response to the second web cache assuming control of the information within the first storage space;

determine whether a local copy of the requested information is present within any of a memory within the second web cache device, the first storage space, or the second storage space;

query remaining web cache devices of the plurality of web cache devices in the web cache system to determine whether the local copy of the requested information is present within the web cache system, if the local copy of the requested information is not found within any of the memory within the second web cache device, the first storage space, or the second storage space; and providing the local copy of the requested information to the requesting computer system, if the local copy of the requested information is located.

3. The system of claim 2 wherein the first and second storage spaces are disposed within at least one storage device.

4. The system of claim 1 wherein the selected one of the web cache devices is the second web cache device, and wherein the second web cache device further comprises:

a memory device for storing cached information, and wherein the second web cache device is configured to respond to an information request for requested information by:

determining whether the requested information is present within either of the memory device, the first storage space, or the second storage space; and redirecting the information request to a different web cache device, if the requested information is not present within any of the memory device, the first storage space, or the second storage space.

5. The system of claim 1 further comprising:

wherein the selected one of the web cache devices is the second web cache device, wherein the third web cache device is coupled to the second web cache device, and configured to perform at least one service of a plurality of services previously provided by the failed first web cache device, wherein the resource manager is further configured to detect when the third web cache device is operational, and to trigger reallocation of the first storage space from the second web cache device to the third web cache device, responsive to detecting that the third web cache device is operational.

6. A method comprising:

allocating, by a processor, a first storage space, a second storage space, and a third storage space within a storage system to a first web cache device, a second web cache device, and a third web cache device respectively, the first, second, and third storage spaces disposed within a plurality storage devices coupled to the storage system;

detecting, by a resource manager, a failure of the first web cache device;

responsive to the detection of the failure of the first web cache device, selecting, using a voting algorithm, either the second web cache device or the third web cache device to assume control of information within the first storage space; and reallocating, by the processor, control of the information stored within the first storage space to the selected one of the second or third web cache devices to enable control of the information stored within the first storage space by the selected one of the web cache devices wherein control of the information includes reading, writing or deleting the information stored within the first storage space.

7. The method of claim 6, wherein the selected one of the web cache devices is the second web cache device, the second web cache device, further comprising:

receiving an information request from a requesting computer system for requested information;

determining whether a local copy of the requested information is present within any of the second web cache device, the first storage space, or the second storage space;

querying remaining web cache devices in the web cache system to determine whether the local copy of the requested information is available, if the local copy of the requested information is not present within any of the second web cache device, the first storage space, or the second storage space; and providing the local copy of the requested information to the requesting computer system, if the local copy of the requested information was found.

8. The method of claim 6 further comprising:

detecting that the third web cache device is operational, wherein the third web cache device is configured to perform at least one service of a plurality of services previously performed by the first web cache device; and triggering reallocation of the first storage space to the third web cache device responsive to detecting that the third web cache device is operational.

9. A non-transitory computer readable medium containing executable program instructions executed by a processor, comprising:

program instructions that allocate a first storage space, a second storage space, and a third storage space within a storage system to a first web cache device, a second web cache device, and a third web cache device respectively, the first, second, and third storage spaces disposed within a plurality of storage devices coupled to the storage system;

program instructions that detect, by a resource manager, that the first web cache device has failed;

program instructions that select, using a voting algorithm, either the second web cache device or the third web cache device to assume control of information within the first storage space; and program instructions that reallocate control of the information stored within the first storage space to the selected one of the second or third web cache devices to enable control of the information stored within the first storage space by the selected one of the web cache devices wherein control of the information includes reading, writing or deleting the information stored within the first storage space.

10. The computer readable medium of claim 9 containing executable program instructions executed by a processor, comprising:

program instructions that receive an information request from a requesting computer system for requested information at the second web cache, wherein the selected one of the web cache devices is the second web cache device;

program instructions that determine whether a local copy of the requested information is present within any of the second web cache device, the first storage space, or the second storage space;

program instructions that query remaining web cache devices in the web cache system to determine whether the local copy of the requested information is available, if the local copy of the requested information is not present within any of the second web cache device, the first storage space, or the second storage space; and program instructions that provide the local copy of the requested information to the requesting computer system, if the local copy of the requested information was found.

11. The computer readable medium of claim 9 containing executable program instructions executed by a processor, comprising:

program instructions that detect that the third web cache device is operational, wherein the third web cache device is configured to perform at least one service of a plurality of services previously performed by the first web cache device; and program instructions that trigger reallocation of the first storage space to the third web cache device responsive to the detection that the third web cache device is operational.

12. The computer readable medium of claim 9 containing executable program instructions executed by a processor, comprising:

program instructions that allocate the first storage space to the first and second web cache devices by granting control of information stored within the first storage space to the first and second web cache devices, wherein the selected one of the web cache devices is the second web cache device.

* * * * *